(12) United States Patent
Yoshida et al.

(10) Patent No.: US 7,824,776 B2
(45) Date of Patent: Nov. 2, 2010

(54) PLATED MATERIAL AND ELECTRIC AND ELECTRONIC PARTS USING THE PLATED MATERIAL

(75) Inventors: Kazuo Yoshida, Tokyo (JP); Kyota Susai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/222,919

(22) Filed: Aug. 19, 2008

(65) Prior Publication Data
US 2009/0061253 A1 Mar. 5, 2009

Related U.S. Application Data

(63) Continuation of application No. PCT/JP2007/053099, filed on Feb. 20, 2007.

(30) Foreign Application Priority Data

Feb. 20, 2006 (JP) .................... 2006-042834
Feb. 19, 2007 (JP) .................... 2007-038697

(51) Int. Cl.
*C25D 5/50* (2006.01)
*H01R 13/03* (2006.01)
*B32B 15/20* (2006.01)

(52) U.S. Cl. ............ 428/647; 428/675; 428/676; 428/687; 428/929; 439/886; 439/887; 148/537; 427/383.7; 427/123; 205/226; 205/228

(58) Field of Classification Search ............ None
See application file for complete search history.

(56) References Cited

U.S. PATENT DOCUMENTS

| 4,441,118 | A | * | 4/1984 | Fister et al. ......... 257/677 |
| 6,083,633 | A | * | 7/2000 | Fister et al. ......... 428/615 |
| 6,336,979 | B1 | * | 1/2002 | Sugawara et al. ...... 148/536 |
| 6,755,958 | B2 | * | 6/2004 | Datta ................. 205/191 |
| 6,759,142 | B2 | * | 7/2004 | Hara et al. ........... 428/647 |
| 2003/0091855 | A1 | | 5/2003 | Tanaka et al. |
| 2003/0186597 | A1 | * | 10/2003 | Suzuki et al. ......... 439/886 |
| 2004/0258556 | A1 | * | 12/2004 | Kim et al. ........... 420/560 |
| 2005/0048308 | A1 | * | 3/2005 | Mucklich et al. ...... 428/614 |
| 2008/0090096 | A1 | * | 4/2008 | Suzuki et al. ......... 428/674 |

FOREIGN PATENT DOCUMENTS

EP 1 203 654 A2 5/2002
JP 11-135226 * 5/1999

(Continued)

OTHER PUBLICATIONS

Chinese Office Action issued on Dec. 18, 2009 in corresponding Chinese application No. 2007800058528 (with English translation).

*Primary Examiner*—John J Zimmerman
(74) *Attorney, Agent, or Firm*—Birch, Stewart, Kolasch & Birch, LLP (57) ABSTRACT

A plated material 5, containing: on a conductive substrate 1, an underlayer 2 composed of nickel and the like; an intermediate layer 3 composed of Cu or a Cu alloy being provided thereon; and an outermost layer 4 composed of a Cu—Sn intermetallic compound being provided thereon; and an electric or electronic part using the same.

15 Claims, 5 Drawing Sheets

FOREIGN PATENT DOCUMENTS

| | | |
|---|---|---|
| JP | 2000-21545 A | 1/2000 |
| JP | 2000-212720 A | 8/2000 |
| JP | 2000-226645 A | 8/2000 |
| JP | 2003-82499 A | 3/2003 |
| JP | 2003-213486 A | 7/2003 |
| JP | 2004-68026 A | 3/2004 |
| JP | 2004-179055 A | 6/2004 |
| JP | 2004-300524 A | 10/2004 |
| JP | 2004-339555 A | 12/2004 |
| JP | 2005-105419 A | 4/2005 |
| JP | 2005-307240 A | 11/2005 |

* cited by examiner

PLATED MATERIAL AND ELECTRIC AND ELECTRONIC PARTS USING THE PLATED MATERIAL

TECHNICAL FIELD

The present invention relates to a plated material favorable, for example, for sliding sections of connection terminals, and to electric and electronic parts, such as fittable multipolar connector, that is improved in push-in/pull-out performance using the plated material.

BACKGROUND ART

Plated materials having a plating layer comprised of tin (Sn) Sn alloy, or the like on a conductive substrate (appropriately referred to a substrate hereinafter) such as copper (Cu) and Cu alloys, are known as high-performance conductors having excellent conductivity and physical strength of the substrate as well as excellent electric continuity, corrosion resistance, and solderability of the plating layer, and have been widely used for various terminals, connectors, and the like. To this plated material, nickel (Ni), cobalt (Co), iron (Fe), or the like having a barrier function is usually underplated on the substrate, in order to prevent alloy components of the substrate (appropriately referred to substrate components hereinafter), such as Zinc (Zn), from diffusing into the plating layer.

While an oxide film is formed on the Sn plating layer on the surface of the terminal, since Sn is readily oxidized under a high temperature environment such as in an engine room of an automobile, this oxide film is so brittle that it is readily broken by connecting the terminal. Consequently, a non-oxidized Sn plating layer under the oxidized Sn plating layer is exposed to give good electric continuity.

Since a fittable connector is made into a multipolar type with the spread of electronic control in recent years, a large force is necessary for push-in/pull-out between a group of male terminals and a group of female terminals. In particular, since push-in/pull-out work is difficult in a narrow space such as the engine room of the automobile, reduction of the push-in/pull-out force is earnestly required.

As a method for reducing the push-in/pull-out force, the contact pressure between the terminals may be weakened by widening the gap between the contact points or by thinning the Sn plating layer on the surface of the connection terminal. However, according to this method, defective continuity may occur between the terminals due to a fretting phenomenon that occurs between the contact faces of the terminal since the Sn plating layer is soft.

In the fretting phenomenon, the soft Sn plating layer on the surface of the terminal is worn and oxidized, due to fine fretting between the contact faces of the terminal caused by vibration, temperature changes, and the like, to form a worn powder having a large specific resistivity. Defective continuity occurs when this phenomenon emerges between the terminals. This phenomenon is liable to emerge as the contact pressure between the terminals is lower.

For preventing the fretting phenomenon, there is proposed a method for forming a hard Cu—Sn intermetallic compound layer, such as $Cu_6Sn_5$, that hardly causes the fretting phenomenon on the substrate. However, this method involves such a problem that the Cu—Sn intermetallic compound layer becomes so brittle by diffusion of a large amount of the substrate components, such as Cu, into the Cu—Sn intermetallic compound layer.

The plated material, in which diffusion of substrate components is prevented by providing a Ni layer between the substrate and the Cu—Sn intermetallic compound layer, may be manufactured by sequentially plating layers of Ni, Cu, and Sn, in this order on the substrate, since neither the Sn layer nor the Cu layer is formed between the Ni layer and the Cu—Sn intermetallic compound layer. When this plated material is subjected to heat-treatment, the thickness of each plating layer of the plated laminate should be strictly designed based on chemical stoichiometric ratio of Cu and Sn with thorough control of heat-treatment. Therefore, production of such a plated material required much labor.

DISCLOSURE OF INVENTION

The present invention contemplates for providing a plated material that may be readily manufactured and is favorable for a sliding section of connection terminals having stable electric continuity. The present invention also contemplates for providing electric and electronic parts, such as fittable multipolar connectors, that are improved in push-in/pull-out property by using the plated material.

According to the present invention, there is provided the following means:

(1) A plated material, comprising: on a conductive substrate, an underlayer composed of any one of nickel, a nickel alloy, cobalt, a cobalt alloy, iron, and an iron alloy; an intermediate layer composed of Cu or a Cu alloy being provided thereon; and an outermost layer composed of a Cu—Sn intermetallic compound being provided thereon;

(2) A plated material comprising: on a conductive substrate, at least two underlayers each composed of any one of nickel, a nickel alloy, cobalt, a cobalt alloy, iron, and an iron alloy; an intermediate layer composed of Cu or a Cu alloy being provided thereon; and an outermost layer composed of a Cu—Sn intermetallic compound being provided thereon;

(3) The plated material according to the above item (1) or (2), wherein the outermost layer is composed of the Cu—Sn intermetallic compound whose major component is a $Cu_6Sn_5$ compound;

(4) The plated material according to the above item (1) or (2), wherein the outermost layer is composed of the Cu—Sn intermetallic compound whose major component is a $Cu_3Sn$ compound;

(5) The plated material according to any one of the above items (1) to (4), wherein Sn or a Sn alloy is dispersed in the outermost layer;

(6) The plated material according to the above item (5), wherein the dispersion state is that at least a part of Sn or the Sn alloy is exposed on the surface of the outermost layer, and Sn or the Sn alloy is dispersed as an island structure or spot structure on a cross sectional view;

(7) The plated material according to any one of the above items (1) to (6), wherein an oxide film with a thickness of 0 to 100 nm is formed on the outermost layer;

(8) An electric or electronic part, wherein at least a fretting (sliding) section is composed of the plated material according to any one of the above items (1) to (7); and (9) The electric or electronic part according to the above item (8), which is a fittable connector or a contact.

Other and further features and advantages of the invention will appear more fully from the following description, appropriately referring to the accompanying drawings.

BEST MODE FOR CARRYING OUT THE INVENTION

The present invention will be described in detail below.

Figure 1:
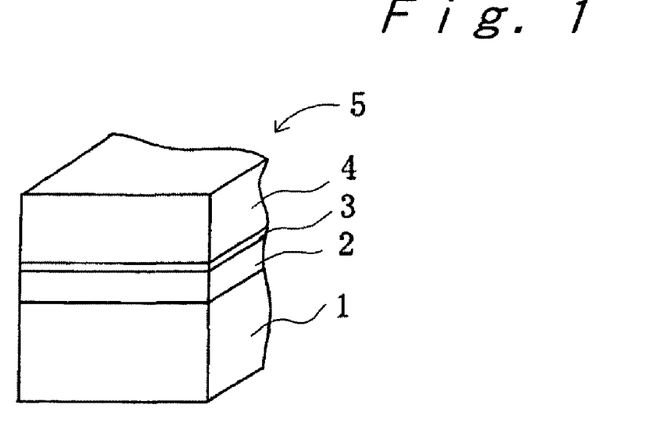
FIG. 1 is a perspective view for illustration showing an embodiment of the plated material of the present invention.

The plated material in an embodiment of the present invention is a plated material 5 that has, on a conductive substrate 1, an underlayer 2 composed of Ni or the like, an intermediate layer 3 composed of Cu or the like provided thereon, and an outermost layer 4 composed of the Cu—Sn intermetallic compound provided thereon, as shown in the perspective view in FIG. 1.

Figure 2:
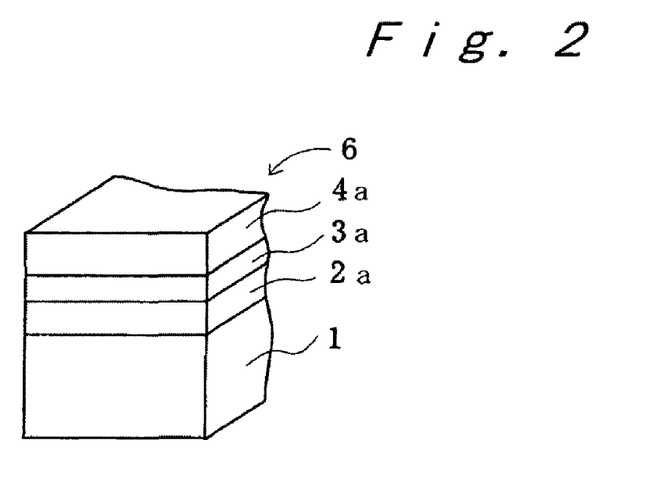
FIG. 2 is a perspective view for illustration of a plated laminate used for manufacturing the plated material of the present invention.

The plated material 5 of the present invention is manufactured, for example, by preparing a plated laminate 6 by plating a Ni layer (N-layer) 2a, a Cu layer (C-layer) 3a, and a Sn layer (S-layer) 4a, on a conductive substrate 1, in this order, as shown in the perspective view in FIG. 2; and by heat-treating the laminate for allowing Cu in the C-layer 3a to react with Sn in the S-layer 4a, to form a Cu—Sn intermetallic compound layer (outermost layer). Diffusion of the substrate components by heat may be prevented by the N-layer 2a during the heat-treatment. The volume ratio (S/C) of the S-layer 4a and the C-layer 3a is determined by taking a required thickness of the Cu—Sn intermetallic compound layer 4 into consideration, so that the S-layer 4a would be extinguished after the heat-treatment while the C-layer 3a remains as an intermediate layer. However, since the thickness of the C-layer 3a (the thickness of the intermediate layer 3a) after heat-treatment is not required to be so strictly defined, design of the plated laminate 6 and heat-treatment of the plated laminate 6 are easily conducted. Thus, the plated material 5 of the present invention may be manufactured in a simple manner with excellent productivity.

The thickness of the C-layer 3a of the plated laminate 6 is generally 0.01 μm or more. The upper limit of the thickness is preferably about 5.0 μm in terms of practical applicability, cost of the material, production cost, and the like. More preferably, the thickness of the C-layer 3a is from 0.05 μm to 0.5 μm. When the C-layer 3a that is composed of Cu is thin, many fine pores may emerge on the C-layer (intermediate layer 3) after the heat-treatment, to result losing of the barrier function as an intermediate layer. Thus, the thickness of the C-layer 3a is some increased in some degree when the C-layer 3a is composed of Cu, as compared with the thickness of the case where the C-layer 3a is composed of a Cu alloy.

In the present invention, it takes a long period of time for allowing the S-layer 4a to undergo complete reaction depending on the thickness of the layer, Sn may happen to be dispersed and remain as a spot or island structure in the outermost layer 4 after the heat-treatment. However, the function of the plated material seldom decreases due to the residual dispersed Sn. In this case, a part of the thus-dispersed Sn or Sn alloy may be exposed on the surface of the outermost layer 4. It is preferable that the exposed area of the exposed Sn or Sn alloy is sufficiently smaller, as compared with the surface area of the dispersed Sn or Sn alloy.

Further, in the case where Sn is dispersed in the outermost layer 4, even when the Cu layer (intermediate layer) 3 remains thick, such Sn may disperse with the excess Cu in the layer, and the effect thereof is remarkable under a higher temperature environment. Accordingly, design area may be expanded in a broader manner and the characteristics may be maintained for a longer period of time under a high temperature environment. In this manner, the plated material of the present invention includes one in which Sn or the Sn alloy may be dispersed into the outermost layer 4. Herein, Sn or the Sn alloy dispersed as a spot or island structure on the cross sectional view, refers to the Sn alloy or Sn in the Cu—Sn alloy layer with an areal occupancy ratio (approximately equal to volume occupancy ratio) of 0 to 60% in the mapping image obtained using, for example, AES (auger electron spectroscopy) device. Furthermore, such a Sn or Sn alloy dispersed as an island structure on the cross sectional view, may be either exposed with a part thereof, or not exposed at all, on the outermost layer surface. Typically, Sn or the Sn alloy, a part of which is exposed on the surface of the outermost layer, contains, in the cross sectional view, a Cu—Sn alloy portion inside of such a Sn or Sn alloy exposed on the surface of the outermost layer, and such a Sn or Sn alloy may be a doughnut shape in the plane view of the surface of the outermost layer. Further, it may be possible to remove, by dissolving with a chemical, Sn or the Sn alloy which is dispersed and remains only in the surface vicinity, among Sn or the Sn alloy which is dispersed and remains in the outermost layer 4. Removing the residual Sn or Sn alloy dispersed only in the vicinity of the surface of the outermost layer, 4 may be preferable, since the presence of so many of the residual Sn or Sn alloy protruded from the surface of the outermost layer 4 may cause the above-mentioned fretting.

The thickness of the intermediate layer 3 in the plated material 5 of the present invention is not particularly limited, but it is preferably from 0.01 to 1.0 µm, more preferably from 0.05 to 0.5 µm.

The thickness of the outermost layer 4 in the plated material 5 of the present invention is not particularly limited, but it is preferably from 0.05 to 2.0 µm, more preferably from 0.1 to 1.0 µm.

The plated material 5 of the present invention is provided with an intermediate layer 3 composed of copper or the copper alloy. Even if the C-layer 3a is extinguished together with the S-layer 4a after heat-treatment of the plated laminate 6, terminal push-in/pull-out property or the like of the plated material is seldom deteriorated relative to the plated material 6 of the present invention.

The plated material may be formed in the present invention so as to have the outermost layer comprising a terminal-sliding section of a Cu—Sn intermetallic compound layer and a wire-clamping section of a Sn layer. The plated material of this embodiment may be manufactured by thinly plating the S-layer at the portion that serves as the terminal-sliding section by masking and the like, and by thickly plating the S-layer at the portion that serves as the wire-clamping section, followed by heat-treatment. According to this method, a plated material having different materials for each portion of the outermost layer may be readily manufactured.

When the plated laminate 6 is heat-treated by means of reflow treatment (continuous treatment), the temperature of the entity of the plated laminate 6 is preferably set to a temperature within the range from 232 to 500° C. and the laminate is preferably heated from 0.1 sec to 10 minutes, more preferably for 100 seconds or less, and further preferably for 10 seconds or less. This reflow treatment is applied, for example, by keeping the temperature in a reflow furnace in the range from 500 to 900° C. and by heating the laminate for 10 minutes or less, preferably for 10 seconds or less. However, since the temperature in the reflow furnace is more readily measured than the temperature of the entity in practical applications, the reflow treatment is preferably applied by controlling the temperature in the reflow furnace. When the reflow treatment is applied by a batch treatment, the laminate is preferably kept in the furnace at 50 to 250° C. for several tens of minutes to several hours. The temperature and heating time period for applying the heat-treatment by reflow treatment should be set up so as to conform to the thickness and the like of the N-layer 2a, C-layer 3a and S-layer 4a of the plated laminate 6, but respective specific conditions may be appropriately set, as explained in the below-mentioned examples.

In the present invention, as the conductive substrate 1, use may be appropriately made of copper, copper alloys such as phosphor bronze, brass, German silver, beryllium copper, and Corson alloy; iron, iron alloys such as stainless steel; composite materials such as copper-clad iron material and nickel-clad iron material; various nickel alloys and aluminum alloys, and the like, each of which has a given conductivity, mechanical strength, and heat resistance required for a terminal, may be appropriately used.

Of the metals and alloys (materials) described above, copper-base materials such as copper and the copper alloys are particularly preferable, since they are excellent in balance between conductivity and mechanical strength. When the conductive substrate 1 is a material other than the copper-base material, corrosion resistance and adhesivity to the plated underlayer 2 may be improved, by coating the surface of the substrate with copper or a copper alloy.

As the underlayer 2 formed on the conductive substrate 1, use may be preferably made of any of metals such as Ni, Co, and Fe; and alloys containing these metals as major components such as Ni—P base, Ni—Sn base, Co—P base, Ni—Co base, Ni—Co—P base, Ni—Cu base, Ni—Cr base, Ni—Zn base, and Ni—Fe base alloys, each of these metals and alloys has a barrier function for preventing the substrate components from diffusing by heat into the outermost layer 4. These metals and alloys have good platablity with acceptable price as materials. Among them, Ni and Ni alloys are particularly preferable since the barrier function does not decline even under a high temperature environment.

While metals (alloys) such as Ni, that can be used for the under layer 2, each have a melting point as high as 1000° C. or more, the environmental temperature of use of the joint connector is as low as 200° C. or less. Accordingly, diffusion of the underlayer 2 itself by heat seldom occurs, to enable the barrier function to be effectively expressed. The under layer 2 also has a function for enhancing adhesivity between the conductive substrate 1 and the intermediate layer 3, depending on the quality of the material of the conductive substrate 1.

The barrier function of the underlayer 2 is not sufficiently exhibited when the thickness of the layer is too small, while the underlayer is apt to be peeled off from the substrate due to large stress of plating when the thickness is too large. The thickness in the range from 0.05 to 3 µm is preferable in the present invention. The upper limit of the thickness of the underlayer 2 is more preferably 1.5 µm, particularly preferably 0.5 µm, in terms of the terminal workability.

The underlayer 2 may be a single layer or be composed of plural layers. Forming plural layers is advantageous in that the barrier function, a function for enhancing adhesivity, or the like may be appropriately set, in relation to the adjacent layer(s).

Copper as well as the copper alloys such as Cu—Sn base alloys may be used for the intermediate layer 3 in the present invention. The Cu concentration of the copper alloy is preferably 50% by mass or more.

In the plated laminate 6 used in the present invention, the volume ratio (S/C) of the S-layer 4a and the C-layer 3a when the S-layer 4a is composed of Sn and C-layer 3a is composed of Cu, is preferably 1.85 or less, and the thickness of S-layer 4a is preferably 9.5 µm or less.

While the N-layer 2a (such as Ni), C-layer 3a (such as Cu), and S-layer 4a (such as Sn) in the plated laminate 6 may be formed by a PVD method and the like, a wet plating method is preferable since it is simple and requires low production cost.

Examples of the Cu—Sn intermetallic compound that forms the outermost layer 4 in the present invention include $Cu_6Sn_5$, $Cu_3Sn$, $Cu_4Sn$, and the like. $Cu_6Sn_5$ is formed by allowing 1.90 volumes of Sn to react with 1 volume of Cu. $Cu_3Sn$ is formed by allowing 0.76 volumes of Sn to react with 1 volume of Cu. $Cu_4Sn$ is formed by allowing 0.57 volumes of Sn to react with 1 volume of Cu.

Accordingly, an outermost layer mainly composed of $Cu_6Sn_5$ is formed by heat treating a plated laminate with a volume ratio (S/C) of the S-layer 4a and the C-layer 3a, for example, from 1.90 to 1.80 for a long period of time; an outermost layer mainly composed of $Cu_3Sn$ is formed by heat treating a plated laminate with the volume ratio (S/C), for example, from 0.76 to 0.70 for a long period of time; and an outermost layer mainly composed of $Cu_4Sn$ is formed by heat treating a plated laminate with the volume ratio (S/C), for example, from 0.57 to 0.50 for a long period of time. These reactions are not undergone completely, for example, as the temperature for the heat-treatment is too high and the time period for the heat-treatment is too short, so that the thickness of the Cu—Sn intermetallic compound layer may be thin or a layer composed of a mixture of $Cu_6Sn_5$, $Cu_3Sn$, and $Cu_4Sn$ may be formed.

In the present invention, when the Cu—Sn intermetallic compound layer 4 is composed of two layers of the $Cu_6Sn_5$ layer and the $Cu_3Sn$ layer, the thickness of each layer is not particularly limited, but the thickness of the $Cu_6Sn_5$ layer is preferably from 0.01 to 5.0 µm and the thickness of the $Cu_3Sn$ layer is preferably from 0.008 to 4.0 µm.

The performance of the plated material 5 of the present invention is not adversely affected even if an oxide film with a thickness of 100 nm or less is formed on the surface of the outermost layer 4. Since the outermost layer 4a before heat-treatment is comprised of Sn or a Sn alloy in the plated material 5 of the present invention, the resultant oxide formed is an oxide of Sn. Since the oxide of Sn has higher conductivity than an oxide of Cu and the like, this oxide seems not to adversely affect the conductivity of the plated material. The thickness of the oxide film is preferably 30 nm or less.

In the present invention, any foreign-matter material thinner than the adjacent layer may be interposed, between the conductive substrate 1 and the underlayer 2, between the underlayer 2 and the intermediate layer 3, and/or between the intermediate layer 3 and the outermost layer 4.

The plated material of the present invention may be arbitrarily configured into such a shape as a plate or sheet, a strip, a round wire, and a rectangular or other flat wire.

In an another embodiment of the present invention, the plated material is electric and electronic parts constructing at least sliding sections, and the electric and electronic parts are, in particular, preferably a fittable multipolar connector or contact. The plated material of the present invention may be processed, for example, into the contacts and fittable connectors for automobiles, as well as into various electric and electronic parts, in a usual manner.

When the plated material of the present invention is used for the sliding section (sliding face) such as terminals, the outermost layer is composed of a hard Cu—Sn intermetallic compound layer, and thus the fretting phenomena hardly occur by reducing the contact pressure between the terminals by widening the gap between the contact points or by thinning the plating layer. Thus, good push-in/pull-out property and electric continuity can be stably obtained, for example, in the terminals using the plated material of the present invention.

Since the plated material of the present invention has an underlayer comprised of Ni or the like on the conductive substrate, the substrate components may be prevented from being diffused into the outermost layer. Since an intermediate layer comprised of Cu or the like is formed on the underlayer, underlayer components such as Ni may be prevented from being diffused into the outermost layer during production or use thereof. Thus, the Cu—Sn intermetallic compound layer of the outermost layer is not contaminated, to enable stable and good electric continuity to be obtained.

The plated material of the present invention can be obtained by plating layers of, for example, Ni, Cu, and Sn in this order, on the substrate, followed by heat-treatment, in which the intermediate layer is formed by permitting the Cu layer to remain or be left behind in the process for producing the plated material. Consequently, design of the plated laminate and heat-treatment of the laminate can be conducted in a simple manner. Furthermore, when permitting the Cu layer to remain, the adhesivity of each plating layer is not deteriorated after allowing the plating layer to be left at high temperatures, while diffusion of elements from the substrate and the underlayer under the intermediate layer may be suppressed, which results in suppression of void formation at the interface of underlayer Ni/Cu—Sn due to Cu—Sn diffusion. Owing to the above, the plated material of the present invention is excellent in the characteristics, as well as it can be produced in a simple manner and is excellent in the productivity.

The present invention will be described in more detail based on examples given below, but the invention is not meant to be limited by these.

EXAMPLES

Example 1

A strip of a copper alloy (yellow brass) with a thickness of 0.25 mm was subjected to degreasing and acid washing in this order, and a plated laminate was prepared by electroplating layers of Ni, Cu, and Sn in this order on the copper alloy strip. The plating condition of each metal is shown in Table 1.

TABLE 1

| Metal for plating | Composition of plating bath | | Bath temp. °C. | Current density $A/dm^2$ |
|---|---|---|---|---|
| | Component | Concentration g/l | | |
| Ni | Nickel sulfamate | 500 | 60 | 5 |
| | Boric acid | 30 | | |
| Cu | Copper sulfate | 180 | 40 | 5 |
| | Sulfuric acid | 80 | | |
| Sn | 524M solution, manufactured by ISHIHARA CHEMICAL Co. | — | 30 | 5 |

The volume ratio (S/C) of the S-layer and the C-layer of the thus-prepared plated laminate was variously changed. Then, the plated laminate was subjected to heat-treatment by a reflow treatment method, to give Sample Nos. 1 to 3 of the plated material having the structure shown in FIG. 1. The thus-obtained Sample Nos. 1 to 3 of the plated material were subjected to the below fine-fretting test up to a fretting reciprocation number of 1,000, and the change of the contact resistance value was continuously measured.

The fine-fretting test was conducted as follows.

Figure 3:
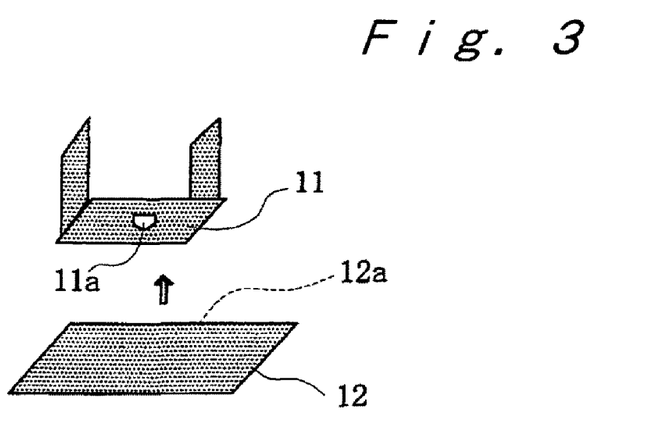
FIG. 3 is a perspective view for illustration of a fine fretting test method.

That is, two sheets each of plated materials 11 and 12 were provided as shown in FIG. 3. A hemispherical protrusion (the outer surface of the convex portion was an outermost layer surface) 11a with a radius of curvature of 1.05 mm was provided on the plated material 11. The hemispherical protrusion 11a was brought into contact with the outermost layer surface 12a of the plated material 12 at a contact pressure of 3N after degreasing and washing the test samples of the plated materials. Both of the samples were made to reciprocally slide within a slide distance of 30 µm under an environment of a temperature of 20° C. and relative humidity of 65%. An open circuit voltage of 20 mV was applied between the plated materials 11 and 12, to flow a constant current of 5 mA. Voltage drop during fretting was measured by a four-probe method, and the change of the electric resistance was measured in every 1 second. The contact resistance value (initial value) before the fine fretting test and the maximum contact resistance value (maximum value) during the fine fretting test are shown in Table 2. The frequency of the reciprocating motion was about 3.3 Hz.

For each plated material, (1) the thickness of the melted and solidified Sn layer remaining on the surface of the outermost layer was measured by an anode dissolution method using an aqueous R50 solution (trade name: manufactured by KOK- OUR Co.), (2) the thickness of the Cu—Sn intermetallic compound at the outermost layer was measured by the anode dissolution method using the R50 solution as in (1), (3) the thickness of the intermediate layer (Cu layer) was measured by the anode dissolution method using the R52 solution (trade name: manufactured by KOKOUR Co.), and (4) the thickness of the underlayer (Ni layer) was measured using a fluorescence X-ray thickness gauge.

The area to be measured was 1 cm$^2$ in each layer. The results of measurement of each thickness are listed in Table 2 together.

Example 2

Sample Nos. 4 to 6 of the plated material were prepared in the same manner as in Example 1, except that the heat-treatment was applied by a batch treatment method, and then the resultant samples were subjected to the same tests and evaluations as in Example 1.

Comparative Example 1

Sample Nos. 7 and 8 of the plated material were prepared in the same manner as in Example 1 or 2, except that the volume ratio (S/C) of the S-layer and the C-layer of the plated laminate was changed to 1.90, and then the resultant samples were subjected to the same tests and evaluations as in Example 1.

Comparative Example 2

Sample Nos. 9 and 10 of the plated material were prepared in the same manner as in Example 1 or 2, except that the volume of the S-layer of the plated laminate was changed to 2.00 times the volume of the C-layer, and then the samples were subjected to the same tests and evaluations as in Example 1.

Comparative Examples 3

Sample Nos. 11 and 12 of the plated material, which were prepared by electroplating the Ni underlayer and the Sn outermost layer in this order on the copper alloy substrate, were subjected to the same tests and evaluations as in Example 1. The thickness of Sn was changed in two ways.

The results of evaluations in Examples 1 and 2 and Comparative Examples 1 to 3, as well as the volume ratio of the S-layer and the C-layer, and the heat-treatment conditions, are shown in Table 2. The "heat-treatment condition" in Table 2 refers to a temperature of the entity.

TABLE 2

| Classification | No. | Volume ratio of plated laminate, S-layer/ C-layer | Heat- treatment condition | Structure of plated material μm | | | Contact resistance mΩ | | | |
|---|---|---|---|---|---|---|---|---|---|---|
| | | | | Under- layer | Inter- mediate layer | Outer- most layer | Surface Sn layer μm | Initial value | Max. value | Remarks |
| Example 1 | 1 | 1.85 | 285° C. × 10 sec | Ni 0.4 | Cu 0.02 | Cu$_6$Sn$_5$ 2.0 | None | 2.0 | 3.5 | |
| | 2 | 0.70 | 285° C. × 10 sec | Ni 0.4 | Cu 0.03 | Cu$_6$Sn$_5$ 1.9 | None | 1.9 | 3.4 | |
| | 3 | 0.50 | 285° C. × 10 sec | Ni 0.4 | Cu 0.03 | Cu$_3$Sn 1.8 | None | 1.8 | 3.7 | |
| Example 2 | 4 | 1.85 | 160° C. × 120 hr | Ni 0.4 | Cu 0.02 | Cu$_6$Sn$_5$ 2.0 | None | 2.5 | 4.2 | |
| | 5 | 0.70 | 160° C. × 120 hr | Ni 0.4 | Cu 0.03 | Cu$_6$Sn$_5$ 1.9 | None | 2.3 | 4.0 | |
| | 6 | 0.50 | 160° C. × 120 hr | Ni 0.4 | Cu 0.04 | Cu$_3$Sn 1.8 | None | 2.2 | 4.1 | |
| Comparative example 1 | 7 | 1.90 | 285° C. × 10 sec | Ni 0.4 | None | Cu$_6$Sn$_5$ 2.1 | None | 0.8 | 11.9 | Manufacture of the plated |
| | 8 | 1.90 | 160° C. × 120 hr | Ni 0.4 | None | Cu$_6$Sn$_5$ 2.1 | None | 0.9 | 17.6 | material was difficult. |
| Comparative example 2 | 9 | 2.00 | 285° C. × 10 sec | Ni 0.4 | None | Cu$_6$Sn$_5$ 2.1 | 0.3 | 0.8 | 88.7 | |
| | 10 | 2.00 | 160° C. × 120 hr | Ni 0.4 | None | Cu$_6$Sn$_5$ 2.1 | 0.4 | 1.1 | 74.3 | |
| Comparative example 3 | 11 | — | — | Ni 0.4 | None | Sn 2.1 | — | 0.8 | 152.1 | |
| | 12 | — | — | Ni 0.4 | None | Sn 1.7 | — | 1.0 | 190.7 | |

As is apparent from Table 2, although the initial resistance values of the plated materials (Examples 1 and 2) of the examples according to the present invention are higher than those of the plated materials of Comparative Examples 1 to 3, the maximum contact resistance values during the fine fretting test of the plated materials of the examples according to the present invention are lower than those of Comparative Examples 1 to 3. This may be elucidated as follows. The fretting phenomenon hardly occurred in the plated material of the examples according to the present invention, since the outermost layer was composed of a hard Cu—Sn intermetallic compound. In addition, diffusion by heat of the underlayer components such as Ni was blocked owing to the presence of the intermediate layer under the outermost layer, and diffusion by heat of the components of the substrate was blocked owing to the presence of the underlayer under the intermediate layer. Thus, the outermost layer remained non-contaminated to enable the function to be favorably maintained.

On the contrary, in Comparative Example 1, due to no intermediate layer formed and insufficient preventive function of diffusion by heat (barrier function), the outermost layer was denatured, and the maximum contact resistance value during the fretting test exceeded 10 mΩ. Further, for this plated material, much labor was necessary for designing of the plated laminate and controlling of the heat-treatment conditions thereof, in order to eliminate the intermediate layer (Cu layer) and Sn layer from this plated material. Contact resistance was conspicuously increased due to incidence of the fretting phenomenon during the fretting test in Comparative Examples 2 and 3, because in Comparative Example 2 the volume ratio (S/C) of the Sn layer and the Cu layer of the plated laminate was larger than 1.90 and the Sn layer was remained on the surface of the outermost layer, and because in Comparative Example 3 the outermost layer was comprised of the Sn layer.

It is considered that the plated material may be hardly used for automobile terminals when the contact resistance exceeds 10 mΩ in the fine fretting test, but the plated materials (Examples 1 and 2) of the present invention can be sufficiently used for the automobile terminals since they each have the contact resistance of far below 10 mΩ.

Example 3

The plated laminate was prepared in the same manner as No. 1 in Example 1, except that, as the underlayer, two layers were provided which were a Ni layer (0.2 μm) and a Ni—Co—P base alloy layer (0.2 μm), and then the fine-fretting test was conducted in the same manner as in Example 1. The results indicate that the initial value of the contact resistance and the maximum value of that during the fine-fretting test were quite as low as 1.7 mΩ and 3.2 mΩ, respectively. This is because diffusion of components of the substrate was more reliably blocked during heat-treatment and during use.

As mentioned in the above, it can been seen from comparison between Examples 1 to 3 and Comparative Examples 1 to 3 that the plated material of the present invention can be sufficient for use as a material for a terminal, since the difference between the initial value and the maximum value of the contact resistance during the fine-fretting test was small, and the initial value of the contact resistance was 3 mΩ or less and the maximum value during the test of the contact resistance was 10 mΩ or less. Further, the results of other examples were evaluated by using 3 mΩ and 10 mΩ as criteria for the initial value of the contact resistance and the maximum value of the contact resistance, respectively, in the fine-fretting test. The results will be explained with reference to the following another examples and comparative examples.

Example 4

Sample Nos. 21 to 23 were prepared approximately in the same manner as in Example 1. Then, two sheets each of plated materials 11 and 12 were provided as shown in FIG. 3. A hemispherical protrusion (the outer surface of the convex portion was an outermost layer surface) 11a with a radius of curvature of 1.8 mm was provided on the plated material 11. The hemispherical protrusion 11a was brought into contact with the outermost layer surface 12a of the plated material 12 at a contact pressure of 3N after degreasing and washing the test samples of the plated materials. Both of the samples were made to reciprocally slide within a slide distance of 30 μm under an environment of a temperature of 20° C. and elative humidity of 65%. An open circuit voltage of 20 mV was applied between the plated materials 11 and 12, to flow a constant current of 5 mA. Voltage drop during fretting was measured by a four-probe method, and the change of the electric resistance was measured in every 1 second. The contact resistance value (initial value) before the fine fretting test and the maximum contact resistance value (maximum value) during the fine fretting test are shown in Table 3. The frequency of the reciprocating motion was about 3.3 Hz. The "heat-treatment condition" in Table 3 denotes the temperature of entity of the plated material heat-treated by the batch treatment method as in Example 2.

In the table, with respect to the initial value, the case where it was 3 mΩ or less is designated to as "○", and the case where it was over 3 mΩ is designated to as "x"; and with respect to the maximum value, the case where it was 10 mΩ or less is designated to as "○", and the case where it was over 10 mΩ is designated to as "x".

For each plated material, (1) the thickness of the melted and solidified Sn layer remaining on the surface of the outermost layer was measured by an anode dissolution method using the aqueous R50 solution (trade name: manufactured by KOKOUR Co.), (2) the thickness of the Cu—Sn intermetallic compound at the outermost layer was measured by the anode dissolution method using the R50 solution as in (1), (3) the thickness of the intermediate layer (Cu layer) was measured by the anode dissolution method using the R52 solution (trade name: manufactured by KOKOUR Co.), and (4) the thickness of the underlayer (Ni layer) was measured using a fluorescence X-ray thickness gauge.

The area to be measured was 1 cm$^2$ in each layer. The results of measurement of each thickness are listed in Table 3 together.

The coefficient of dynamic friction was measured using a Burden-type friction tester under the conditions of a load of 300 gf (2.94 N), a fretting distance of 10 mm, a fretting rate of 100 mm/min, and the number of fretting of 1 (one time). The counter material to be used was subjected to protrusion work with a radius of curvature (R) of 0.5 mmR after applying reflow Sn plating at a thickness of 1 μm on a brass strip with a thickness of 0.25 mm. The results of measurement of the friction coefficient are shown in Table 3.

Comparative Example 4

Sample No. 24 of the plated material was prepared in the same manner as in Example 2, except that the volume ratio (S/C) of the S-layer and the C-layer of the plated laminate was changed to 1.90, and then the resultant samples were subjected to the same test and evaluations as in Example 1. The results are shown in Table 3.

Comparative Example 5

Sample No. 25 of the plated material was prepared in the same manner as in Example 2, except that the volume of the S-layer of the plated laminate was 2.50 times the volume of the C-layer, and then the sample was subjected to the same tests and evaluations as in Example 1. The results are shown in Table 3.

Comparative Example 6

The same tests and evaluations as in Example 1 were conducted on the material sample No. 26, which was prepared by electroplating of Sn on a copper alloy substrate. The results are shown in Table 3.

Comparative Example 7

The same tests and evaluations as in Example 1 were conducted on the material sample No. 27, which was prepared by electroplating of Sn on a copper alloy substrate followed by heat-treatment on a hot plate. The results are shown in Table 3.

TABLE 3

| Classification | No. | Volume ratio of plated laminate S-layer/C-layer | Heat-treatment condition | Structure of plated material μm | | | Surface Sn layer μm | Contact resistance | | Friction coefficient |
| --- | --- | --- | --- | --- | --- | --- | --- | --- | --- | --- |
| | | | | Under-layer | Inter-mediate layer | Outer-most layer | | Initial value | Max. value | |
| Example 4 | 21 | 1.85 | 160° C. × 120 hr | Ni 0.4 | Cu 0.02 | $Cu_6Sn_5$ 2.0 | None | o | o | 0.18 |
| | 22 | 0.7 | 160° C. × 120 hr | Ni 0.4 | Cu 0.03 | $Cu_6Sn_5$ 1.9 | None | o | o | 0.12 |
| | 23 | 0.5 | 160° C. × 120 hr | Ni 0.4 | Cu 0.04 | $Cu_6Sn_5$ 1.8 | None | o | o | 0.11 |
| Comparative example 4 | 24 | 1.9 | 160° C. × 120 hr | Ni 0.4 | $Cu_6Sn_5$ 2.1 | Sn 0.1 | 0.1 | o | x | 0.20 |
| Comparative example 5 | 25 | 2.5 | 160° C. × 120 hr | Ni 0.4 | $Cu_6Sn_5$ 0.2 | Sn 1.3 | 1.3 | o | x | 0.22 |
| Comparative example 6 | 26 | — | Not conducted | None | $Cu_6Sn_5$ 1.2 | Sn 2.5 | 2.5 | o | x | 0.66 |
| Comparative example 7 | 27 | — | 260° C. × 3 sec (hot plate) | None | $Cu_6Sn_5$ 1.3 | Sn 1.1 | 1.1 | o | x | 0.65 |

As is apparent from Table 3, the initial values of the plated material (Example 4) of the examples according to the present invention was 3 mΩ or less and the maximum values of the plated material (Example 4) of the examples according to the present invention was 10 mΩ or less in the fine fretting test, but the maximum values of the plated material of Comparative Examples 4 to 7 in the fine fretting test exceeded 10 mΩ (specifically, all the values exceeded 15 mΩ).

In Comparative Example 4, due to the outermost layer comprised of Sn layer was denatured and the maximum contact resistance value during the fretting test exceeded 10 mΩ. Contact resistance was conspicuously increased due to incidence of the fretting phenomenon during the fretting test in Comparative Examples 5, because in Comparative Example 5 the volume ratio (S/C) of the Sn layer and the Cu layer of the plated laminate was larger than 1.90 and the Sn layer was remained on the surface of the outermost layer, and because in Comparative Examples 6 and 7 the outermost layer was comprised of the Sn layer.

It is considered that the plated material may be hardly used for automobile terminals when the contact resistance exceeds 10 mΩ in the fine fretting test, but the plated material (Examples 4) of the present invention can be sufficiently used for the automobile terminals since they each have the contact resistance of far below 10 mΩ.

Since the plated material of the present invention has a smaller frictional coefficient than that of the comparative examples, the plated material of the present invention requires smaller force for pushing-in/pulling-out and is excellent in push-in/pull-out property.

Example 5

The volume ratio (S/C) of the S-layer and the C-layer of the plated laminate was adjusted as shown in Table 4, and a plated laminate was prepared in the same manner as in Example 1. The plated laminate was treated by the reflow treatment method shown in Table 4, and sample Nos. 31 to 44 of the plated material were prepared. Here, the "heat-treatment condition" in Table 4 denotes the temperature in the reflow furnace, and in Table 4, the temperature in the reflow furnace was fixed to 740° C. and the heat-treatment time was varied.

In each of the thus-obtained plated materials, a cross sectional surface with an angle of 30° aslant was formed by FIB (focused ion beam) with an inclination angle of the sample of 600, which was used for a sample for Auger electron spectrum (AES) analysis. Then, AES analysis was performed by tilting the sample so that the 300 aslant cross sectional surface was horizontal, and the thickness of each layer was measured from the AES electron images. The structures are shown in Table 4. Since the Cu—Sn intermetallic compound in the outermost layer was present as a layer of a mixture of $Cu_6Sn_5$, $Cu_3Sn$, and $Cu_4Sn$, they were measured as the Cu—Sn alloy layer.

Figure 4:
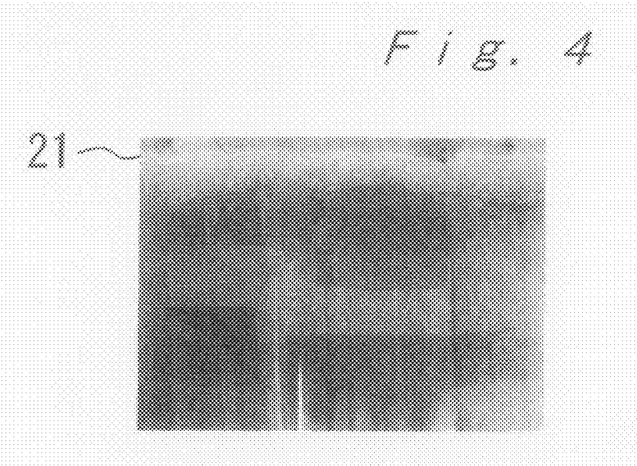
FIG. 4 is a SEM photograph of the cross sectional view of Sample No. 32 in Example 5.
Figure 5:
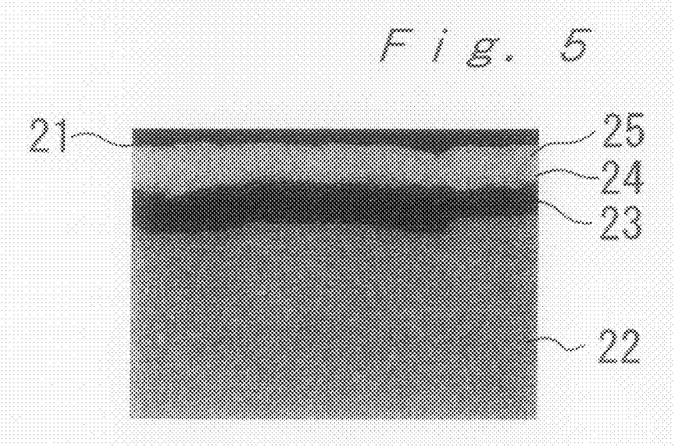
FIG. 5 shows a mapping image (Sn—Cu—Ni map) of the measured part, as shown in FIG. 4, which was obtained using an AES device.
Figure 6:
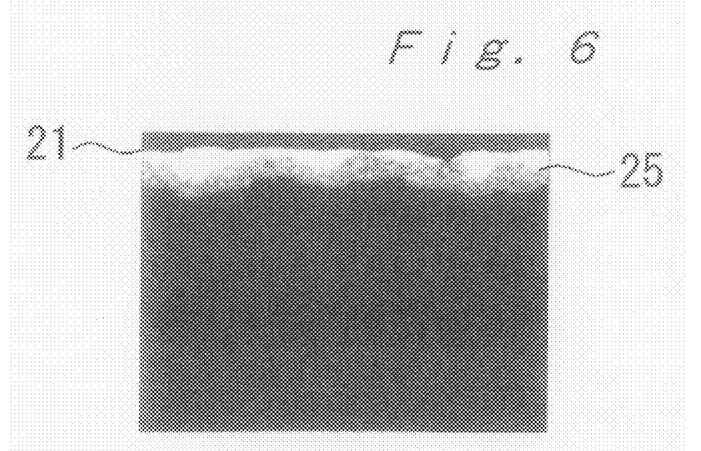
FIG. 6 shows a mapping image (Sn map) of the measured part, as shown in FIG. 4, which was obtained using an AES device.
Figure 7:
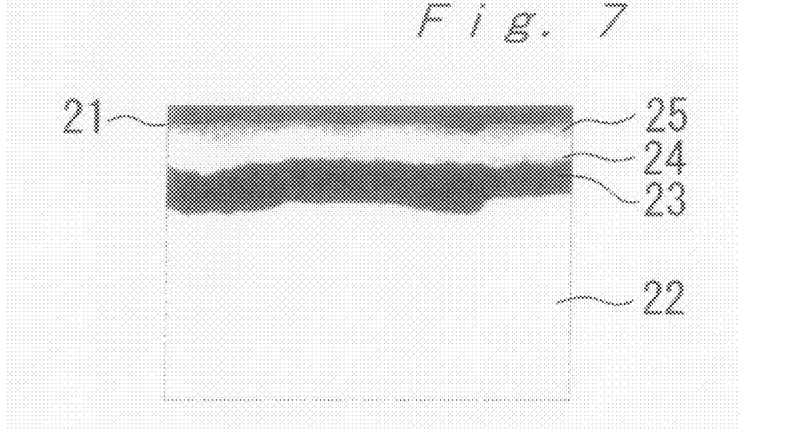
FIG. 7 shows a mapping image (Cu map) of the measured part, as shown in FIG. 4, which was obtained using an AES device.
Figure 8:
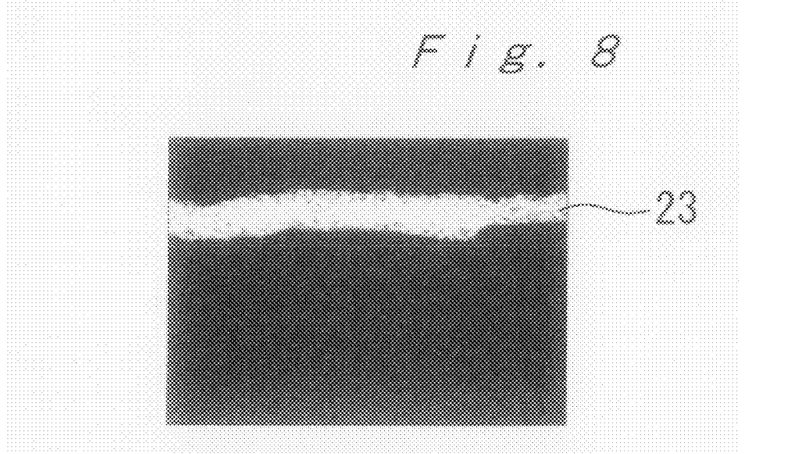
FIG. 8 shows a mapping image (Ni map) of the measured part, as shown in FIG. 4, which was obtained using an AES device.
Figure 9:
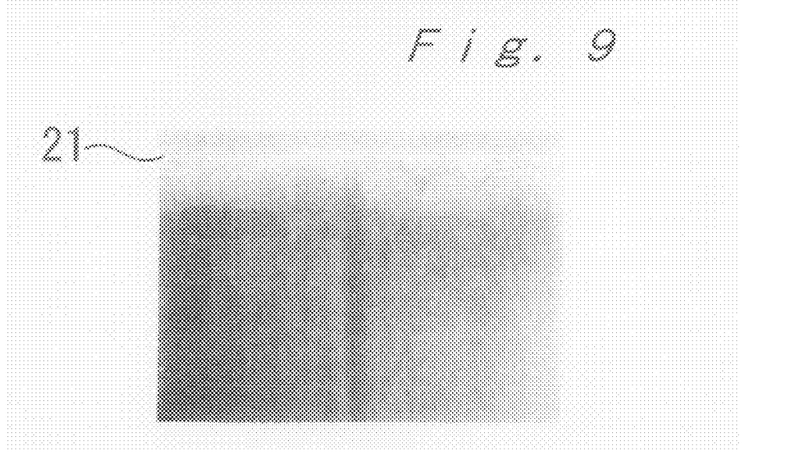
FIG. 9 is a SEM photograph of the cross sectional view of Sample No. 36 in Example 5.
Figure 10:
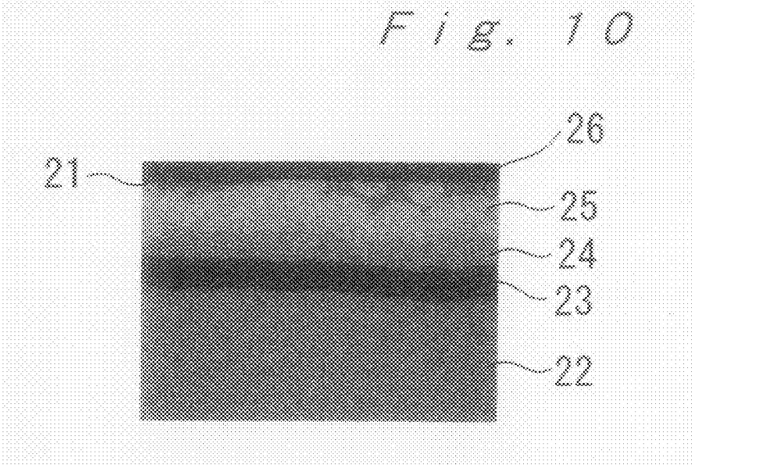
FIG. 10 shows a mapping image (Sn—Cu—Ni map) of the measured part, as shown in FIG. 9, which was obtained using an AES device.
Figure 11:
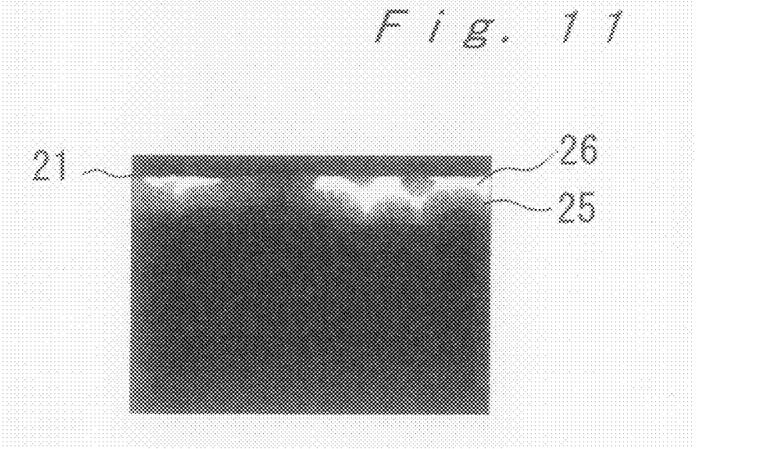
FIG. 11 shows a mapping image (Sn map) of the measured part, as shown in FIG. 9, which was obtained using an AES device.
Figure 12:
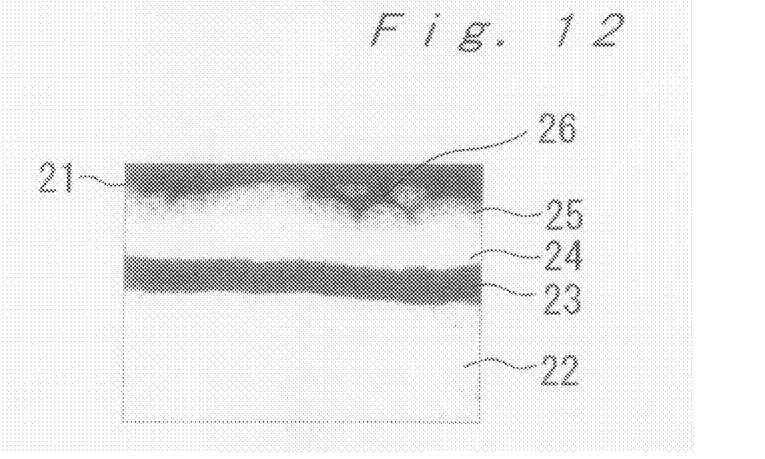
FIG. 12 shows a mapping image (Cu map) of the measured part, as shown in FIG. 9, which was obtained using an AES device.
Figure 13:
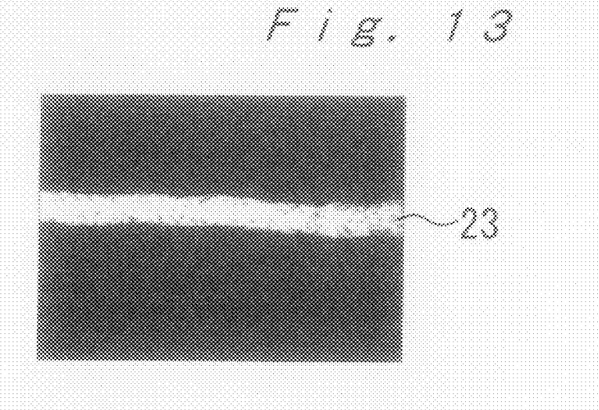
FIG. 13 shows a mapping image (Ni map) of the measured part, as shown in FIG. 9, which was obtained using an AES device.

Sn in the outermost layer was dispersed as a floating island structure. With respect to the amount of the dispersion, one from 0 to 10% is designated to as "small", from 10 to 30% "middle", and from 30 to 60% "large", for example, from the occupancy rate of the area of the Sn or Sn alloy in the Cu—Sn alloy layer in FIGS. 5 to 8 and FIGS. 10 to 13 of the mapping images obtained by using the AES analyzer. Here, FIGS. 4 to 8 correspond to Sample No. 32 in Table 4, and FIGS. 9 to 13 correspond to Sample No. 36 in Table 4. FIG. 4 and FIG. 9 are SEM photographs (horizontal width: 11.7 μm) of the AES measured part of the cross sections of Sample Nos. 32 and 36, respectively. FIGS. 5 to 8 are mapping images showing metallic structure of the measured part shown in FIG. 4, and FIGS. 10 to 13 are mapping images showing the metallic structure of the measured part shown in FIG. 9. FIG. 5 and FIG. 10 are Sn—Cu—Ni maps in which Sn, Cu, and Ni are shown by contractions in different colors; FIG. 6 and FIG. 11 are Sn maps in which Sn is shown by white color; FIG. 7 and FIG. 12 are Cu maps in which Cu is shown by white color; and FIG. 8 and FIG. 13 are Ni maps in which Ni is shown by white color.

In FIGS. 4 to 8, 21 denotes the surface of the outermost layer, 22 denotes the substrate, 23 denotes the underlayer, 24 denotes the intermediate layer, and 25 denotes the outermost layer. In FIG. 6, the outermost layer 25 is shown by white color, this shows that the brighter part at the surface 21 side contains much Sn. In FIG. 7, the underlayer 23 is shown by black color, this shows that the underlayer 23 did not substantially contain Cu. In FIG. 8, only the underlayer 23 is shown by white color, this shows that Ni s not diffused in other layers except the underlayer 23.

In FIGS. 9 to 13, 21 denotes the surface of the outermost layer, 22 denotes the substrate, 23 denotes the underlayer, 24 denotes the intermediate layer, and 25 denotes the outermost layer. In FIG. 10, Sn or Sn alloy 26 shown by dense color is dispersed in an island structure in the outermost layer 25. In FIG. 11, the outermost layer 25 is shown bright, this shows that the whiter island structure portions at the surface 21 side contain much of the Sn or Sn alloy 26. In FIG. 12, it is shown that Cu is not substantially contained in the underlayer 23 and in the Sn or Sn alloy 26 in an island structure. in FIG. 13, only the underlayer 23 is shown white, this shows that Ni is not diffused into other layers except the underlayer 23.

As shown in FIGS. 5 to 8, in Sample No. 32, the area occupied by the Sn or Sn alloy in the Cu—Sn alloy layer on the Ni layer, was from 0 to 10%. On the other hand, as shown in FIGS. 10 to 13, in Sample No. 32, the area occupied by the Sn or Sn alloy in the Cu—Sn alloy layer on the Ni layer, was from 30% to 60%.

The plated materials each were subjected to the fine fretting test in the same manner as described in Example 1, and the contact resistance before the test (i.e. an initial value) and the maximum resistance value during the fretting test (i.e. a maximum value at fretting) were measured. Further, each of fine fretting test pieces of the plated material was subjected to the fine fretting test as described above after maintaining the fine fretting test piece in a thermostat bath at 160° C. for 120 hours, and the contact resistance value (i.e. the initial value) before the test and the maximum resistance value (i.e. the maximum value at fretting) during the fretting test were measured. The marks "○" and "x" in Table 4 are considered to have the same meanings as in Table 3, but there is such a difference from Table 3 in that a boundary region "Δ" is defined in the intermediate of the characteristically preferable range "○" and the characteristically unpreferable range "x", taking the scatter in characteristics in the production into consideration. Practically, whether a sample containing data in the "Δ" range is to be employed as a product or not, is to be judged depending on the environment of use and the like.

Specifically, the sample having the initial value of less than 2.4 mΩ is designated to as "○", one from 2.4 to 3.6 mΩ is designated to as "Δ", and one over 3.6 mΩ is designated to as "x". Further, the sample having the maximum value of less than 8 mΩ is designated to as "○", one from 8 to 12 mΩ is designated to as "Δ", and one over 12 mΩ is designated to as "x". In other words, the central value of "Δ" is 3 mΩ in the initial value and is 10 mΩ in the maximum value, and the width of "Δ" is ±20% of the central value.

The dynamic frictional coefficient was measured in the same manner as in Example 4, and the results are shown in Table 4.

Comparative Example 8

Sample No. 45 of the plated material was prepared in the same manner as in Example 5, except that the volume ratio (S/C) of the S-layer and the C-layer of the plated laminate was changed to 2.70, and then the resultant sample was subjected to the same test and evaluations as in Example 4. The results are shown in Table 4.

Comparative Example 9

Sample No. 46 of the plated material was prepared in the same manner as in Example 5, except that the volume of the S-layer of the plated laminate was changed to 2.80 times the volume of the C-layer, and then the sample was subjected to the same tests and evaluations as in Example 4. The results are shown in Table 4.

Comparative Example 10

Sample No. 47 of the plated material was prepared in the same manner as in Example 5, except that the C-layer and the S-layer were provided on a copper alloy substrate and the volume of the S-layer of the plated laminate was changed to 7.00 times the volume of the C-layer, and then the sample was subjected to the same tests and evaluations as in Example 4. The results are shown in Table 4.

TABLE 4

| Classification | No. | Volume ratio of plated laminate S-layer/C-layer | Heat-treatment conditions, reflow furnace | Structure of plated material (μm) | | | Dispersion of Sn in outermost layer | Contact resistance | | After standing at high temp. | | Friction coefficient |
|---|---|---|---|---|---|---|---|---|---|---|---|---|
| | | | | First layer | Second layer | Third layer | | Initial value | Max. value at fretting | Initial value | Max. value at fretting | |
| Example 5 | 31 | 1.67 | 740° C. × 7 sec | Ni 0.4 | Cu 0.01 | Cu—Sn 0.40 | Middle | ○ | ○ | ○ | Δ | 0.21 |
| | 32 | 1.00 | 740° C. × 7 sec | Ni 0.4 | Cu 0.05 | Cu—Sn 0.35 | Small | ○ | ○ | ○ | ○ | 0.19 |
| | 33 | 0.83 | 740° C. × 7 sec | Ni 0.4 | Cu 0.3 | Cu—Sn 0.40 | Middle | ○ | Δ | ○ | ○ | 0.23 |
| | 34 | 0.50 | 740° C. × 7 sec | Ni 0.4 | Cu 0.3 | Cu—Sn 0.35 | None | ○ | ○ | Δ | ○ | 0.19 |
| | 35 | 1.00 | 740° C. × 7 sec | Ni 0.4 | Cu 0.32 | Cu—Sn 0.55 | Large | ○ | Δ | ○ | Δ | 0.27 |
| | 36 | 0.63 | 740° C. × 7 sec | Ni 0.4 | Cu 0.36 | Cu—Sn 0.45 | Large | ○ | ○ | ○ | ○ | 0.24 |
| | 37 | 0.38 | 740° C. × 7 sec | Ni 0.4 | Cu 0.4 | Cu—Sn 0.35 | None | ○ | ○ | Δ | ○ | 0.18 |
| | 38 | 1.83 | 740° C. × 7 sec | Ni 0.2 | Cu 0.01 | Cu—Sn | Large | ○ | ○ | ○ | ○ | 0.23 |

TABLE 4-continued

| Classification | No. | Volume ratio of plated laminate S-layer/C-layer | Heat-treatment conditions, reflow furnace | Structure of plated material (µm) First layer | Second layer | Third layer | Dispersion of Sn in outermost layer | Contact resistance Initial value | Max. value at fretting | After standing at high temp. Initial value | Max. value at fretting | Friction coefficient |
|---|---|---|---|---|---|---|---|---|---|---|---|---|
|  | 39 | 1.07 | 740° C. × 8 sec | Ni 0.6 | Cu 0.05 | Cu—Sn 1.30 1.65 | None | ○ | ○ | ○ | ○ | 0.18 |
|  | 40 | 0.80 | 740° C. × 7 sec | Ni 0.3 | Cu 0.5 | Cu—Sn 1.20 | Small | ○ | ○ | ○ | ○ | 0.21 |
|  | 41 | 0.47 | 740° C. × 7 sec | Ni 0.5 | Cu 0.6 | Cu—Sn 0.65 | None | ○ | ○ | Δ | ○ | 0.17 |
|  | 42 | 1.14 | 740° C. × 5 sec | Ni 0.1 | Cu 0.25 | Cu—Sn 0.50 | Middle | ○ | ○ | ○ | ○ | 0.23 |
|  | 43 | 1.00 | 740° C. × 9 sec | Ni 0.4 | Cu 0.45 | Cu—Sn 1.85 | Large | ○ | ○ | ○ | ○ | 0.28 |
|  | 44 | 0.38 | 740° C. × 6 sec | Ni 0.4 | Cu 0.75 | Cu—Sn 0.55 | None | ○ | ○ | Δ | ○ | 0.14 |
| Comparative example 8 | 45 | 2.7 | 740° C. × 7 sec | Ni 0.2 | Cu—Sn 0.55 | Sn 0.5 | — | ○ | x | ○ | x | 0.35 |
| Comparative example 9 | 46 | 2.8 | 740° C. × 3 sec | Cu 0.15 | Cu—Sn 1.85 | Sn 0.8 | — | ○ | x | ○ | x | 0.42 |
| Comparative example 10 | 47 | 7.0 | 740° C. × 6 sec | Cu—Sn 0.6 | Sn 1.2 | — | — | ○ | x | ○ | x | 0.61 |

As is apparent from Table 4, the initial value of the contact resistance of the plated material of the example according to the present invention (Example 5) is lower than 3.6 mΩ that is the maximum value of "Δ" in Table 4, and the maximum value of the contact resistance of the plated material of the example according to the present invention (Example 5) during the fine fretting test is also lower than 12 mΩ that is the maximum value of "Δ" in Table 4. Further, with respect to the results of the fine-fretting test after allowing the samples to stand at a high temperature, it can be said that the plated material does not be adversely affected by allowing to be left in a high temperature environment.

On the contrary, each of the samples in Comparative Examples 8 to 10 show that the maximum value of exceeding 12 mΩ during the fine fretting test, and this tendency did not change after leaving them at a high temperature.

Figure 14:
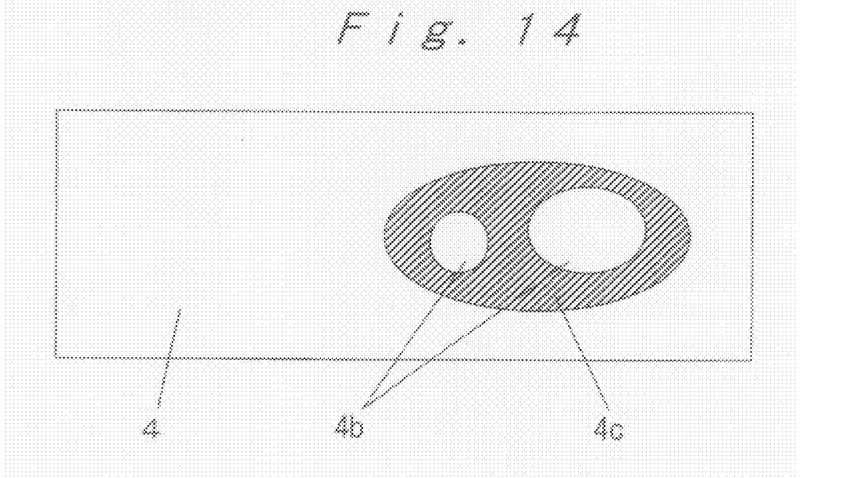
FIG. 14 is a schematic plane view showing an example of distribution of the Cu—Sn alloy and Sn on the surface of the outermost layer, corresponding to a part of the measured part shown in FIG. 9.
Figure 15:
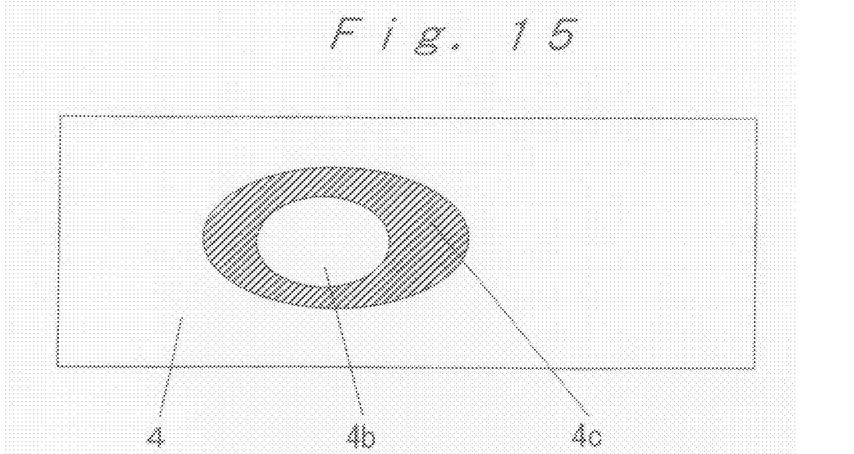
FIG. 15 is a schematic plane view showing another example of distribution of the Cu—Sn alloy and Sn on the surface of the outermost layer, corresponding to a part of the measured part shown in FIG. 9.

With respect to Sample No. 36, as shown in FIG. 10, the Sn or Sn alloy 26 is dispersed in an island structure in the Cu—Sn alloy layer (i.e. the outermost layer 25), and a part of such a Sn or Sn alloy 26 that is dispersed in an island structure is exposed on the surface 21 of the Cu—Sn alloy layer. Further, as schematically illustrated in FIGS. 14 and 15, the Sn or Sn alloy exposed on the surface of the Cu—Sn alloy layer contains a Cu—Sn alloy portion inside thereof (the Sn or Sn alloy looks like being exposed approximately in a doughnut shape in the Cu—Sn alloy layer from observation on the surface). In FIGS. 14 and 15, 4 denotes the outermost layer composed of a Cu—Sn intermetallic compound, and 4b denotes the Cu—Sn intermetallic compound. Further, 4c denotes a part of such a Sn or Sn alloy that constitutes the Sn layer (S-layer), as in FIG. 2, and as for Sample No. 36, the Cu—Sn intermetallic compound 4b is connected to the outermost layer 4 composed of the Cu—Sn intermetallic compound, thereby to form a part of the outermost layer.

The above-mentioned state emerges when the volume ratio of the S-layer and the C-layer of the plated laminate is smaller than 1.90 (a condition in which no Sn layer remains on the surface of the plated material when all Sn is converted into the Cu—Sn alloy), and when the heat-treatment is made to terminate by, for example, quenching such that Sn would not be converted into the Cu—Sn alloy. In such a state, the Cu—Sn alloy, which is present around the Sn or Sn alloy exposed on the surface of the Cu—Sn alloy layer and which is more rigid than the Cu—Sn alloy layer, is brought into contact with a contact point or the like. Thus, the Sn or Sn alloy exposed on the surface of the Cu—Sn alloy layer has a little chance to be deleted therefrom, thereby to make the alloy layer to be hardly affected by the fretting. In addition, since there is room that Cu present in the lower layer side of the Cu—Sn alloy layer is allowed to react with the Sn or Sn alloy dispersed in the Cu—Sn alloy layer upon being left at a high temperature, thereby to form the Cu—Sn alloy. As a result of the above phenomena, to the resultant plated material, CuO or the like is not formed on the surface thereof, to give an effect for stabilizing the contact resistance.

Example 6

With respect to the plated materials in Example 4 (Sample Nos. 21 to 23) in Table 3 and in Example 5 (Sample Nos. 31 to 44) in Table 4, an oxide of Sn (SnO) was formed on the surface of the outermost layer of the respective plated material, with a thickness within the range of 0 to 10 nm, 40 to 60 nm, or 80 to 100 nm. To the thus-obtained the plated materials, the fine-fretting test was conducted in the same manner as in Example 4. As a result, the tendency obtained in this test did not change at all, as compared to those in Tables 3 and 4.

INDUSTRIAL APPLICABILITY

The plated material of the present invention is favorably used for the sliding section of the connection terminal. The electric and electronic parts each using the plated material of the present invention are excellent in push-in/pull-out property, and are favorably used for fittable multipolar connector.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2006-042834 filed in Japan on Feb. 20, 2006, and Patent Application No. 2007-038697 filed in Japan on Feb. 19, 2007, each of which is entirely herein incorporated by reference.

The invention claimed is:

1. A plated material, comprising: on a conductive substrate, an underlayer comprising any one of nickel, a nickel alloy, cobalt, a cobalt alloy, iron, or an iron alloy; an intermediate layer comprising Cu or a Cu alloy; and an outermost layer comprising a Cu—Sn intermetallic compound;
   wherein Sn or a Sn alloy is dispersed in the outermost layer;
   wherein at least a portion of said Sn or Sn alloy is exposed on the surface of the outermost layer, and
   wherein said Sn or Sn alloy is dispersed as an island structure or a spot structure in a cross sectional view.

2. The plated material according to claim 1, wherein the major component in said outermost layer comprising a Cu—Sn intermetallic compound is a $Cu_6Sn_5$ compound.

3. The plated material according to claim 1, wherein the major component in said outermost layer comprising a Cu—Sn intermetallic compound is a $Cu_3Sn$ compound.

4. The plated material according to claim 1, wherein an oxide film with a thickness of from more than 0 to 100 nm is formed on the outermost layer.

5. An electric or electronic part, wherein at least a fretting section is composed of the plated material according to claim 1.

6. The electric or electronic part according to claim 5, which is a fittable connector or a contact.

7. The plated material according to claim 1, wherein the plated material is formed by providing a plated laminate having, on a conductive substrate, an underlayer comprising any one of nickel, a nickel alloy, cobalt, a cobalt alloy, iron, or an iron alloy; a C-layer comprising Cu; and an S-layer comprising Sn, and subjecting the plated laminate to a reflow treatment;
   wherein the volume ratio of the S-layer and the C-layer is 1.85 or less.

8. The plated material according to claim 1, wherein the plated material is formed by providing a plated laminate having, on a conductive substrate, at least two underlayers, wherein each of the underlayers comprises any one of nickel, a nickel alloy, cobalt, a cobalt alloy, iron, or an iron alloy; a C-layer comprising Cu; and a S-layer comprising Sn, and subjecting the plated laminate to a reflow treatment,
   wherein the volume ratio of the S-layer and the C-layer is 1.85 or less.

9. The plated material according to claim 7, wherein the reflow treatment is conducted in a reflow furnace at a temperature in the range of from 500° C. to 900° C. for 0.1 seconds to 10 minutes.

10. The plated material according to claim 8, wherein the reflow treatment is conducted in a reflow furnace at a temperature in the range of from 500° C. to 900° C. for 0.1 seconds to 10 minutes.

11. The plated material according to claim 1, wherein the outermost layer has a thickness of from 0.05 µm to 2.0 µm, and wherein the intermediate layer has a thickness of from 0.01 µm to 1.0 µm.

12. The plated material according to claim 1, wherein the underlayer comprises at least two layers, and each of said two layers comprises any one of nickel, a nickel alloy, cobalt, a cobalt alloy, iron, or an iron alloy.

13. The plated material according to claim 12, wherein the outermost layer has a thickness of from 0.05 µm to 2.0 µm, and wherein the intermediate layer has a thickness of from 0.01 µm to 1.0 µm.

14. A method of preparing a plated material, comprising the steps of:
   providing a plated laminate having, on a conductive substrate, an underlayer comprising any one of nickel, a nickel alloy, cobalt, a cobalt alloy, iron, or an iron alloy; a C-layer comprising Cu provided on the underlayer; and an S-layer comprising Sn provided on the C-layer, wherein the volume ratio of the S-layer and the C-layer is 1.85 or less;
   subjecting the plated laminate to a reflow treatment in a reflow furnace at a temperature in the range of from 500 to 900° C. for 0.1 seconds to 10 minutes, so as to allow the Cu in the C-layer to react with the Sn in the S-layer, to form a Cu—Sn intermetallic compound; and
   obtaining a plated material having, on the conductive substrate, said underlayer, an intermediate layer comprising Cu on the underlayer; and an outermost layer comprising said Cu—Sn intermetallic compound on the intermediate layer;
   wherein Sn is dispersed in said outermost layer;
   wherein at least a part of Sn is exposed on the surface of said outermost layer; and
   wherein Sn is dispersed as an island structure or spot structure on a cross sectional view.

15. The method of preparing a plated material according to claim 14, wherein the underlayer comprises at least two layers, and wherein each of said two layers comprises any one of nickel, a nickel alloy, cobalt, a cobalt alloy, iron, or an iron alloy.

* * * * *